(12) United States Patent
Pérez Cortés (10) Patent No.: US 11,113,077 B1
(45) Date of Patent: Sep. 7, 2021

(54) NON-INVASIVELY INTEGRATED MAIN INFORMATION SYSTEM MODERNIZATION TOOLBOX

(71) Applicant: Sergio Pérez Cortés, Las Condes (CL)

(72) Inventor: Sergio Pérez Cortés, Las Condes (CL)

(*) Notice: Subject to any disclaimer, the term of this patent is extended or adjusted under 35 U.S.C. 154(b) by 0 days.

(21) Appl. No.: 17/153,608

(22) Filed: Jan. 20, 2021

(51) Int. Cl.
*G06F 17/00* (2019.01)
*G06F 3/048* (2013.01)
*G06F 9/445* (2018.01)
*G06F 16/951* (2019.01)
*G06F 16/955* (2019.01)
*G06F 8/38* (2018.01)
*G06Q 10/10* (2012.01)

(52) U.S. Cl.
CPC ........... *G06F 9/44526* (2013.01); *G06F 8/38* (2013.01); *G06F 9/44505* (2013.01); *G06F 16/951* (2019.01); *G06F 16/9566* (2019.01); *G06Q 10/103* (2013.01); *G06Q 10/1093* (2013.01)

(58) Field of Classification Search
CPC .... G06F 9/44526; G06F 16/9566; G06F 9/54; G06F 16/951; G06F 8/38; G06F 9/4405; G06F 40/143; G06F 3/0482; G06Q 10/1093; G06Q 10/103
USPC .......................... 715/200, 234, 763; 719/311
See application file for complete search history.

(56) References Cited

U.S. PATENT DOCUMENTS

| | | | |
|---|---|---|---|
| 7,275,063 B2 | 9/2007 | Horn | |
| 9,910,644 B2 | 3/2018 | Chang et al. | |
| 10,073,679 B2 | 9/2018 | Straub et al. | |
| 10,198,490 B2 | 2/2019 | No et al. | |
| 10,200,453 B2 | 2/2019 | Momchilov et al. | |
| 10,255,253 B2 | 4/2019 | Akselrod et al. | |
| 2010/0011282 A1* | 1/2010 | Dollard | G06F 40/169 715/233 |

FOREIGN PATENT DOCUMENTS

EP          2850552 B1      5/2019

OTHER PUBLICATIONS

Jimmy, How to Use the Evernote Web Clipper, published Nov. 26, 2020 via wayback machine, pp. 1-79 (pdf).*

* cited by examiner

*Primary Examiner* — Manglesh M Patel
(74) *Attorney, Agent, or Firm* — Mariana Vernieri (57) ABSTRACT

Systems and methods for adding modern management tools to existing browser-accessible Main Information Systems without modifying their source code, through the use of an on-screen toolbox organized around Basic Units. These basic units are extracted from the Main Information Systems' Basic URLs and identified with the use of a Unique Pair fromed by a Main Key and a Basic URL. The tools allow the user to add, delete, and edit, through a tool window, information associated with the active Basic Unit, and can include tasks, calendars, notes, digital folders, and messages, non-invasively integrated to the Main Information System.

8 Claims, 3 Drawing Sheets

NON-INVASIVELY INTEGRATED MAIN INFORMATION SYSTEM MODERNIZATION TOOLBOX

TECHNICAL FIELD

The present invention relates in general to systems and methods for modernizing Main Information Systems and, in particular, to systems and methods for adding modern management tools to existing Main Information Systems without modifying their source code, through the use of an on-screen toolbox organized around Basic Units extracted from the Main Information Systems' Basic URLs.

BACKGROUND OF THE INVENTION

Most companies and organizations, big and small, base their operations in outdated computer systems, application programs, or software that, even if they do not provide useful and modern capabilities, are still in use today due to the great difficulty and cost that overhauling these systems would mean to the company or organization. These outdated computer systems are usually called "Legacy Systems", some of which are so old that they need to be replaced, as the newer systems cannot interact with the old systems. A Legacy System is a software program or system that may have become obsolete due to more recently developed software trends, and because of this, the old system has become less functional and, in extreme cases, impossible to use without modernizing. However, many of the major government and non-government organizations as well as private companies and businesses of all sizes operate with outdated MISs for essential business operations, such as high-volume data processing and day-to-day operations of their organization. Other companies, even if they use more modern systems such as CRMs, customer support software, finances software, etc., still have the problem that these separate systems are not integrated between them and they do not have an unified set of management and collaboration tools that can be used across them all, integrating even the Legacy Systems with the modern ones. Whether or not they are outdated, these computer systems used by companies and individuals to organize different aspects of their operations are hereinafter referred to as "Main Information Systems" or just "MISs" in the context of the present specification and claims.

As technology accelerates, everyone must modernize; otherwise, they may be exposed to downtime when they least expect it. However, the old systems may not be easy to change, so supplementing an outdated MIS with modern management and collaboration tools is a reasonable option to replace it entirely. A common type of MIS that usually needs modernization is commonly known as an "ERP". ERP is an acronym that stands for Enterprise Resource Planning. It is a business process management software that manages and integrates the financial, supply chain, operations, reporting, manufacturing, and human resources activities of a company. Most companies have some kind of financial and operating system, but most of the software that exists cannot go beyond day-to-day business processes or help with future business growth. As a business needs to change and expand, their systems should keep up with it. ERPs are a type of MIS that very frequently are in need of modernization, but they are not the only ones. Many different kinds of MISs, and not only ERPs, could benefit from adding features such as tasks, calendars, notes, digital folders, and messages, among others, to their existing functionalities, and this is nowadays impossible to do without, migrating all the information to a new software, which is often too complicated, expensive and inconvenient for companies to afford. Nowadays there are innumerable critical systems for certain businesses that, due to their age, lack certain tools considered essential today for modern and efficient management (for example, a Digital Folder to store documents). The risk of incorporating these tools—either by intervening the programming code of the system itself or by migrating the information to a more modern system that integrates them natively—is often so relevant that companies choose to continue living with these deficiencies.

Other examples of the kinds of MISs in need of modernization include the systems often used by some banks, which maintain many systems operating for specific products that are quite old but reliable (For example: origination and administration of mortgage loans). These systems generally do NOT have any management tool such as those indicated, and these must be supplied outside the application with: i) a digital folder from another provider; ii) communicating with the client or with other collaborators of the same company through a corporate mailbox but totally disconnected from the system, or; iii) scheduling tasks in Google calendar—which, as is known, mixes the schedules of all operations.—Only thinking about the number of mails that are generated during the origination process of a particular mortgage loan (either with the client or internally), evidences the huge effort needed to rebuild its history when necessary. A system and method that allows banks to organize these emails, tasks, calendars and other important management tools around each particular mortgage loan operation, as an example of what can be used as a Basic Unit, without needing to change their base MIS, would be of great novelty and utility, advancing the field. But banks are not the only organizations that would benefit from this. On the contrary, this is useful for all kinds of companies and organizations in different industries. As another example, many law firms usually still depend on old software to manage their dockets, clients, and cases, that do not include this kind of functionality. The same can be said about real estate firms, auto retailers and clinics, as well as commercial business and companies in almost any industry. In many of these, it is frequent to find people keeping notes in agendas or paper notebooks, or updating the follow-up of their Operations or Business in excel spreadsheets hosted on their own PCs where they also store important documents—which ideally should be made available to a team instead-scheduling critical business tasks on their personal calendars; or making inquiries and/or sealing deals through their corporate email—which mixes messages from multiple clients and various topics, etc. These are all suboptimal approaches that these users need to take in order to precariously and partially overcome the deficiencies of their outdated MISs without upgrading them. Although there are many modern management and collaboration tools available, none of them integrates to the MISs, and they need to be used separately from these, resulting in duplication of information, disconnection between systems, generalized disorder and generation of outdated records and contradictory information between the different, unconnected, systems utilized.

Many of these outdated MISs, still in use, have a user interphase in the form of an internet-based platform that is accessed by the users through web browsers such as Google Chrome, Firefox, or Microsoft Edge. These platforms usually consist of a collection of dynamically generated URLs, often presenting data from a database to which they are connected, such as a MySQL database. The information is often organized in such a way that any given URL within the platform corresponds to a Basic Unit. These will be called "Basic URLs" in the context of this specification and the appended Claims. Depending on the MIS, this Basic Unit can be identified by a unique code, main key, or "index" associated, for example to a Client Name, a Client number, a Request Number, an Operation Number, a Business Number, etc. Each Basic URL presents this index in some part of the screen. At the same time, in some embodiments, these Basic Units of the MISs can be subdivided in Sub-Units in several layers of subclassification. A system able to capture this index and any eventual sub-indexes from a Basic URL of an existing MIS and create, edit and modify useful management tools such as tasks, calendar, notes, digital folders, and messages associated to these indexes and organized around them as Basic Units would facilitate the integration of these modern tools to the existing MISs without modifying their source code, solving a long felt and unresolved problem in an innovative fashion and greatly advancing the field.

SUMMARY OF THE INVENTION

The main object of the present invention is to provide a new and improved computer-based system and method to non-invasively integrate useful management tools and functions into each of the Basic Units of a browser-accessible Main Information System (MIS). Even if this is in principle associated with working life (as an employee of a company or independent worker), it can also be used by the user for their personal activities, based on any existing browser-accessible computing system in which these activities are organized or providing a website for this purpose if necessary. The solution simulates a software integration without having to intervene with any programming source code, allowing a MIS to incorporate modern management tools and other specific functions.

The connection of the MIS with an on-screen Toolbar including useful management tools and functions is done virtually, capturing two elements of the MIS that allows to associate in a unique and reliable way all the information registered in the Toolbar's management tools and functions. This pair consists of (a) A Basic Unit's Basic URL within the MIS, and (b) the location within the Basic URL of point "a" where the Index or primary key that identifies each Basic Unit of the MIS is located on the page. This Basic Unit can refer to a client, an operation, a transaction, a customer service ticket, or any other type of entity that has a distinct Basic URL associated within the MIS, and around which the tools and functions of the Toolbar are to be organized.

This means that, for any Basic URL within the MIS which has the same format than the typical Basic Unit's Basic URL defined in point "a", the position of the form field, html division, or similar, where the name or short text that best identifies/describes the Basic Unit is recorded (for example, operation name, customer name, subject, etc.) will be the same, and therefore easily located by the system, and this index will be used in all the tools of the Toolbar as the main identificator of the Basic Unit to which each tool applies. The URL is visible from the moment the user enters the MIS. The Index or primary key is visible when the user enters any of the forms of a particular Basic Unit within the MIS.

In some cases, within a Basic Unit it is possible to find several subclassifications that will act as sub-units. For example, if the Basic Unit is a Company, the Sub-Unit can be the departments within the Company, and then a second layer of classification can be an Employee within the department of the company, and a third layer of classification can be a given Case for that Employee within the department of the company. A person of Ordinary Skill in the art will recognize from this specification different ways to adapt a system to work in consideration of these subcategories, being these variations encompassed within the spirit and scope of the present invention.

Sometimes a MIS has different kinds of foul's or Basic URLs, corresponding to different categories of Basic Units. For example, a given MIS may have a form for Clients, another one for Colleagues and another one for Sales Operations, all having different formats and form fields or dynamic URL's divisions and their associated database components. During the Toolbar's configuration process, the user enters three of each of these forms or URL formats and clicks on the field or screen location where the primary key (Index) is presented, so that the system can detect its different locations (depending on the active form) and store for each one of them the pair or correlation (Basic URL, Index Location). From that moment on, it will be understood that when the index field or location contains a known value, the system must associate the active Basic Unit in the MIS with the information stored in the Toolbar's tools for that pair (Basic URL, Index).

Once the system has been configured for a specific MIS, the user has a suite of basic tools linked to each MIS's Basic Unit. In this way, when opening any Basic Unit the user will be able to display any of these tools and use it while executing their usual work in the MIS.

A system and method for adding modern management tools to existing Main Information Systems without modifying their source code, is achieved by combining some or all of the following elements:

a) An on-screen toolbox that can be implemented as a browser extension including but, not limited to a Google Chrome extension or a Firefox Plugin including some of all of the following tools, all accessible by the same user and by any other authorized member of his team or community to allow for collaborative work:

1—Notebook: allows the user to leave a note of any relevant situation that affects the development of the Basic Unit.

2—Tasks: allows the user to add, complete, assign to himself or to another team member, modify or record the level of advancement of tasks related to the Basic Unit.

3— Calendar: Isolated calendar for the Basic Unit, with scheduling alerts to remember commitments and associated events.

4— Contact Book: list of contacts related to the Basic Unit Contains names, phone numbers, email, and any other data of interest, as well as the way in which they are involved with the Basic Unit.

5— Digital Folder: repository of documents associated with the particular Basic Unit, which accepts various formats, and which would allow some degree of classification prior to set up. Documents can be cataloged as public (visible to another user outside the organization) or private (only accessible to users within the company or team)

6— Messaging System: direct and isolated communication channel for each Basic Unit, where there is a record of all queries, clarifications, agreements, exceptions, etc. that are configuring and supporting the final result of the process. This "Communication channel" or "messaging system" is associated exclusively with a Basic Unit, NOT with a person as is usual in the most popular applications.

7—Notification center: a tool window where notifications, incoming messages, important news and alerts associated with the active Basic Unit, the Active MIS, and/or critical alerts and incoming deadlines about some or all Basic Units of some or all MISS for which the user is applying the Toolbox are displayed.

b) This Toolbox is presented in a screen together with the information already displayed by the existing MIS, when this MIS has an Internet-based platform that can be accessed by a web browser. This can be accomplished by sharing the screen, occupying the toolbox less than a quarter of the size of the screen and located in left part, top part, bottom part, right part, or any other part of the screen, as well as by a floating window, transparent window or any other kind of arrangement that allows for the display of both the toolbox and the base URL.

c) A main key or index is identified, and, together with the active URL constitute a unique pair to identify the Basic Unit, and all the information stored in the system's databases is indexed to that combination (Basic URL, Index). This Basic Unit can be in the labor/business environment (business prospect of a real estate management system, or a trial that is being carried out by a law firm, or a claim managed by a help desk, or a mortgage loan operation, etc.), but also in the personal sphere (organizing a wedding party, or buying a house, or a trip with family or a group of friends, etc.). When applicable, sub-keys are identified for sub-units of the basic unit, in as many levels of classification as adequate to fit the MIS's structure.

d) The tools of point "a" above, are organized around Basic Units, corresponding to the Indexes extracted from the Main Information Systems' Basic URLs in point "c" above.

e) When the user is browsing a URL known to the system and selects any of the Toolbar's tools, the system takes the Index to complete the pair (Basic URL, Index), it searches for all the information registered for that tool in its database and displays in the tool window all the information found.

f) The information registered in any of the System's tools will be stored in the cloud, in a reliable repository and available 24/7 from anywhere and for all authorized users within each "Community".

g) The same toolbar can be set up by a user to work with many different forms in many different MISs, each shared with different teams, at the same, time (several MISs, a single management tool)

h) The toolbar presents to the user relevant alerts and notifications related to all of the MISs configured to use with the system, even when the corresponding MISs are not open in the browser.

A method for a user to make use of the seamless incorporation of various management tools as if they were native of the MIS, without requiring the slightest intervention in its programming Source Code is disclosed, comprising three simple steps:

1— Downloading the Browser Extension from Chrome Web Store or similar, registering as a user and configuring some general parameters.

2— Opening the Main Information System (MIS) to which the management tools are to be integrated and selecting the management tools to make available for said MIS.

3— identifying each Basic URL within the MIS that contains information about a Basic Unit and selecting the field where the Primary Key or index is located in each of them.

In cases where the MIS contains more than one form or screen having information associated to the same Basic Unit, Step 3 should be performed for each one of those screens or forms. Once Step 3/3 is completed, the MIS is already integrated with the toolbar and all the information that is registered in any of its tools for a certain Basic Unit will be stored in a secure repository and will be available every time the user logs in, connects to the MIS again and enters the same Basic Unit. Other methods can be used for identifying a Unique Pair pointing to a Basic Unit, composed by a Basic URL and the location of a Main Key. For example, with the incorporation of AI (Machine Learning) the user would not need to repeat step 3/3 to indicate the location of the Main Key or to debug the URL. In simple words, it would be enough for the user to simply use the toolbox while browsing any MIS and, the application would independently learn where the Main Key is and what the Basic URL is (and the Nodal URL as well) to establish the Unique Pair around which the information will be organized in the database.

Furthermore, a system and method in accordance with the present invention offers additional advantages when compared to the existing alternatives, these advantages including but not limited to: (a) It is a single platform that integrates with several systems (a single download and installation, and a single toolbar that consolidates the activity of all MISs, in addition to Personal Issues); (b) Communication is 100% focused on a Basic Unit, and does not mix with other conversations, each Operation or Personal Issue having its history completely isolated from the rest and visible at all times; (c) Ability to integrate into any MIS in a simple way and without the need to intervene in its programming source code (rescuing its URL and combining it with the primary key or Index of each Basic Unit, whose location is captured by the own user during the setup process); (d) This special ability to be integrated into any system allows associating to each Operation—not just a client—a series of management tools and special functions as if they were native to MIS; (e) isolated and direct communication channel between users who co-participate in the MIS, and that can even incorporate other people who do not interact with the MIS but who are related to the Operation or Personal Issue; (g) It is not necessary to leave the MIS to save images or files to another system, or to schedule a task, an event in the calendar, or to send messages or emails—which until now have been mixed with those related to other topics or Operations/Business/ Others.

DETAILED DESCRIPTION AND BEST MODE OF IMPLEMENTATION

Definitions. The description of the following terms will contribute to the understanding of the methodology and use of the Main Information System Modernization Toolbox here proposed:

a. Main Information System (or MIS): Means the existing software utilized by a User to access and organize information about business or personal operations. This software is usually outdated, as in the case of Legacy Systems. In the context of this specification and claims, the kind of MISs that will be referred to is the kind that can be accessed online through a web browser, and which is organized in such a way that there is a Basic URL for each relevant Basic Unit.

b. Basic URL: It is an URL within a MIS corresponding to a Basic Unit. Basic URLs are often generated dynamically by connecting to a database, and, when opened as a webpage in a web browser, they display information related to a Basic Unit in a standardized form.

a. Nodal URL: is an URL within a MIS that contains web links to different Basic URLs within a category. Not all MISs have them, and their existence is not necessary for the toolbox to work. However, when present, these URLs contain useful information for the toolbox, including their structure within the MIS, that should be stored in the toolbox's database and consulted when needed for better performance.

b. Basic Unit: The person, topic, or entity to which a Basic URL within a MIS refers. It can be, for example, a client, a prospect, a product, a contract, a case, an operation, a property, or many other concepts depending on the focus of the MIS in question.

c. Main Key: It is afield of information that appears somewhere within a Basic URL's address and/or webpage's content and which acts as a unique identifier of the Basic Unit to which that Basic URL refers. It can be a number (such as a client number) or it can be also an alphanumeric field.

d. User: Any person, individually or within an organization, who uses a Main Information System as described above and wishes to modernize it by incorporating a toolbox in accordance with the present invention.

e. Toolbox: Refers to an application, especially as downloaded by a User to computer, and installed as a complement or plug-in of a web browser, but it also can refer to a website, standalone program or any other computerized means to offer tools though a Graphic User Interface that interacts an MIS's basic URL.

f. Tools: The tools referred to in the context of this specification and claims are computerized tools for productivity, management, and online collaboration. They may include but are not limited to as tasks, calendars, notes, digital folders, and messages, among others.

g. Tool window: A computerized window that occupies a portion of the screen and allows the User to view, edit or add information about the active Basic Unit by using the active toolbox's tool.

A Non-Invasively Integrated Main Information System Modernization Toolbox that has as a main purpose providing the Users with a set of useful tools associated with each Basic Unit of a MIS without the need of intervening the source code of the MIS is here proposed.

The toolbox can be programed to work as a Browser Plugin which, once an initial configuration is set up by the user, identifies not only the MIS but also the Basic Units within the MIS and associates, through an internal database, all the information entered through any of the tools to the active Basic Unit. This way, when the user comes back to a given Basic URL in his MIS, he or she can recover in the Tool Window the information stored in the toolbox's database about that Basic Unit in previous sessions. The setup can include different levels of access for different users, for example within an organization, to allow for a collaborative workflow.

During the initial setup, the toolbox for a certain MIS, the user has to perform three easy steps:

1—Downloading the Browser Extension from Chrome Web Store or similar, registering as a user and configuring some general parameters.

2— Opening the Main Information System (MIS) to which the management tools are to be integrated and selecting the management tools to make available for said MIS.

3— Entering a specific Basic Unit in the active MIS and going through some or all of its screens or forms, selecting the field where the Index or Basic Unit is located in each one of them.

In order to correctly identify a Basic URL, Artificial intelligence may be used, programmed in such a way as to identify, with help of the user when required, where the the Main Key is located in each one of the web pages associated to a certain Basic Unit within each MIS, determining the structure of the MIS and where and how the URL itself and/or the contents of the webpages of the MIS display the relevant information to unequivocally identify the Basic Unit to which the content of the active webpage refers. That is to say that a person of Ordinary Skill in the art would know how to set up an AI-based model that can learn from user's inputs and find out where the Basic URLs and the Main Keys for identifying Basic Units are, for a wide array of different possible designs and structures of MISs. Even without requiring Artificial Intelligence, a Basic URL can be correctly identified with an initial setup process performed by the user. For example, in one embodiment, the User is invited to take a tour consisting of three or more cycles, which prompt him or her to open different Basic Units. The first time, the system will capture one or more URLs and the location of the Index in each of them (in addition to their associated content). In the second cycle of Main Key identification, the system will compare each URL captured in both iterations to confirm if they are identical, and if not, to determine and isolate—for each one of them—the component that remains identical in both, which will be identified with the variable "Xk". The extension of this identical Xk component in each case will be "nk" characters. In the third cycle, the system will capture the first "ink" characters of each URLk and will compare the result with the variable Xk determined at the end of the previous cycle. If the comparison is exactly as expected, the system will confirm a successful configuration and will store each pair (Xk, Yk), where Xk will be a Basic URL and "Yk" the location of the Index or Main Key for said Basic URL. If the comparison is not exact, the system will repeat the step described in the previous cycle identifying the new "Xk", and then it will ask the user to load another known Primary Key once more.

This repetition of the process with at least three different specific Basic Units is necessary for some designs of MISs, in view of the not-so-unlikely possibility of finding URLs "contaminated" with information from the specific Basic Unit, as will be explained later with reference to FIG. 1. In some MISs in which there is only one Basic URL associated to each Basic Unit, this process will easily determine that this is the situation, if in the first cycle, the user selects only one URL as pertaining to the Basic Unit and then marks the first cycle as completed. The system captures this first Basic URL, prompts the user to identify the location of the Main Key in this Basic. URL and stores this Basic URL associated with this Main Kev in the database. Then, in the second second cycle, the user enters a second URL containing all the information available in the MIS about the second Basic Unit, and the system captures the second Basic URL, compares the first basic URL to the second Basic URL to confirm if they are identical, and if not, to determine and isolate a component that remains identical in both, which is identified with an X variable, the extension of this X variable being n characters. In the third cycle, the user enters a third URL containing all the information available in the MIS about the third Basic Unit, the system captures this third basic URL, isolates its first "n" characters, storing them in a Y variable, and compares the result to the X variable determined in the previous cycle. If the Y variable obtained in this cycle has an identical value to the X variable obtained in the previous cycle, the system confirms a successful configuration and stores each unique pair of Basic URL and location of the Main Key for the Basic Units, but if the comparison is not exact, the system repeats the step described in the third cycle, browsing to a new Basic Unit, and identifying a new value for the Y variable. However, if the initial setup process determines that there are several forms or Basic URLs corresponding to the same Basic Unit, the initial setup would require more steps, that a Person of Ordinary Skill in the art could derive from the teachings in this specification to adapt to different possible structures and designs of MISs. For example, if a MIS comprises five URLs about each basic Unit, each of which groups together information of the same nature about the Basic Unit, and the Main Key that uniquely identifies the Basic Unit to which the, information displayed in each of said URLs is located somewhere within the address of the URLs and/or the content of the web pages that said URLs display, the user would need to go through all its URLs or Screens to capture in each of them the position of the Main Key. The user would be prompted to do this tour first with a Primary Key, and then we repeat it two times with different primary keys, identifying the location of the Main Key in a total of fifteen URLs, five for each Basic Unit, in three different cycles. To start the configuration, the user opens the MIS, enters a Main Key, and then goes through each of its five pages. In each of the three cycles, the system temporarily stores the pairs (URL, Location of the Main Key) to be able to debug each URL and isolate the Basic URL in each case. In this example, as the cycle includes five different URLs, at the end of the first cycle with a first Primary Key, the system will have captured five URLs and five Primary Key Locations (one for each URL), defining five unique pairs. At the end of the second tour, the system will be able to isolate the part of the URL that is common for the two Main Keys entered. They could be the same pairs determined at the end of the first cycle, or slightly different if the URL(s) had to be debugged (the resulting URL in each of the 5 pairs could be "trimmed" so that the isolated component is common in both cycles). At the end of the third cycle, the system should confirm each of the five pairs. If so, the URL of each pair will be recognized as a Basic URL and the system will permanently store each of the five pairs (Basic URL, Primary Key Location). If the system cannot confirm it, it will request the User to repeat a fourth tour with a fourth Primary Key, and so on until the structure is correctly identified and confirmed.

Some general aspects of the present invention have been summarized so far in the first part of this detailed description and in the previous sections of this disclosure. Hereinafter, a detailed description of the invention as illustrated in the drawings will be provided. While some aspects of the invention will be described in connection with these drawings, it is to be understood that the disclosed embodiments are merely illustrative of the invention, which may be embodied in various forms. The specific materials, methods, structures, and functional details disclosed herein are not to be interpreted as limiting. Instead, the intended function of this disclosure is to exemplify some of the ways —including the presently preferred ways—in which the invention, as defined by the claims, can be enabled for a Person of Ordinary Skill in the Art. Therefore, the intent of the present disclosure is to cover all variations encompassed within the spirit and scope of the invention as defined by the appended claims, and any reasonable equivalents thereof.

Figure 1:
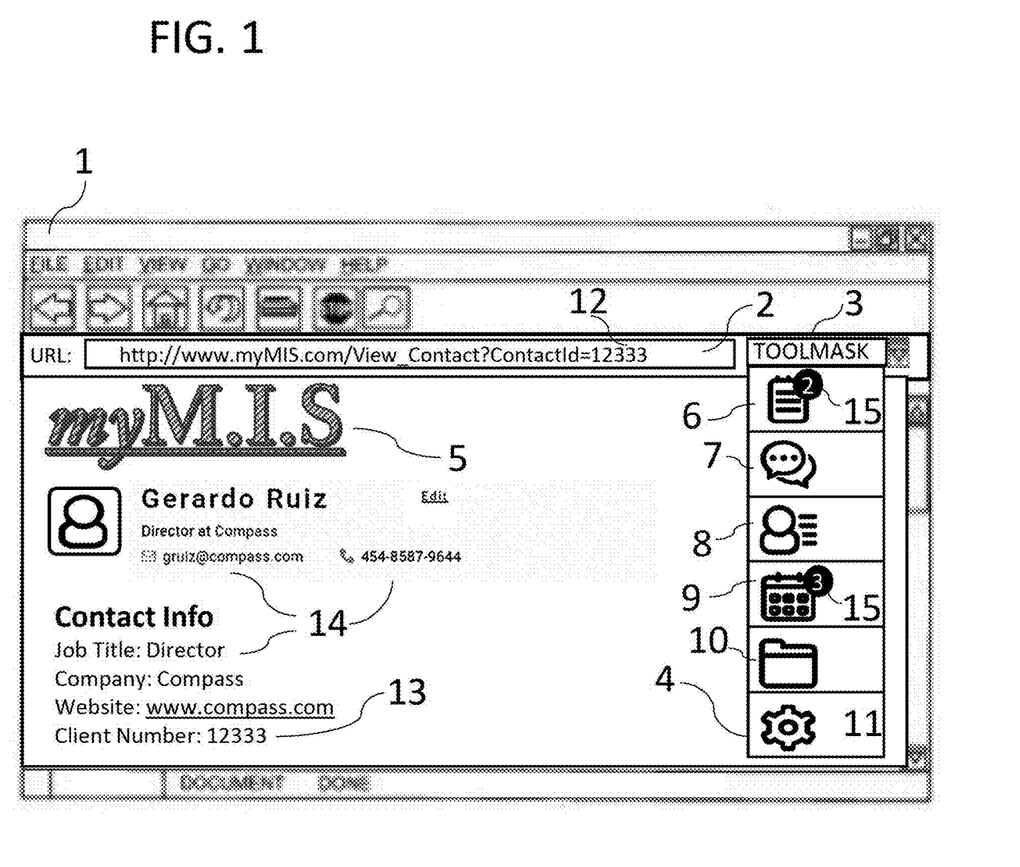
FIG. 1 is a representation of a computer screen showing an example of a Main Information System open in a web browser, together with an embodiment of a Non-Invasively Integrated. Main Information System Modernization Toolbox in accordance with the present invention.

Referring to the drawings in more detail, FIG. 1 represents a computer screen displaying an example of a Main Information System open in a Web Browser 1. The active URL 2 is shown in an example of a Basic URL within the MIS. A dropdown 3 opens and closes the Toolbox 4, which is shown in the right portion of the screen, including icons for accessing different tools associated with the active URL 2. The toolbox can have different layouts and designs and be displayed in different content areas of the screen, as well as including different tools and using different icons, buttons or words to identify each of them, and it can be opened and closed through different mechanisms without departing from the spirit and scope of the present invention. "My.M.I.S." is an example title 5 for the active MIS. It is habitual for MISs to include the title on every page, but it is no requisite for this invention, since the invention adapts to existing MISs not being the contents of it part of what is here claimed. The tools in this example are: notes 6, which opens a notepad in which the user can view, add, and edit text annotations related to the active Basic Unit, Messages 7, which acts as an instant messenger/email central for communications among different users with access to the same MIS about the active Basic Unit, Contacts 8, where contact information about people and companies associated with the active Basic Unit are stored, calendar 9, to view, edit and add time-sensitive tasks in relation to the active Basic Unit, a shared folder 10, where files related to the active Basic Unit can be organized, uploaded and downloaded by the authorized users and finally, Setup 11, for general configurations. As said before, different tools can be used in other embodiments without departing from the spirit and scope of the present invention.

The Basic Unit in this example corresponds to an individual client, named "Gerardo Ruiz". More information about this Basic Unit is displayed in other fields 14 of the website. When visiting the MIS and entering the Main Key "12333" associated with this Client, all the tools mentioned above refer to this person and will keep their content while the user navigates through the different URLs of the MIS.All the tools mentioned above refer to this person when the Basic URL of this person is open. When the user navigates to other Basic URLs within the MIS, the information about these other clients will be loaded and the tools will access and edit the information associated with them instead. This is, in the case in which a single Basic URL corresponds one-to-one to a Basic Unit. For other configurations of MISs, a person of Ordinary Skill in the art could easily see a way to adapt the tool to them. For example, in cases in which for the same URL there are many Basic Units because the URL is maintained but the information that appears on the screen varies depending on the Main Key that the user has entered, the information displayed in the tool window will only change when the user enters a new Main Key in the MIS.

As explained before, other MISs use other concepts as Basic Units, and not necessarily clients or people. The main key, in this example, is the Client number "12333". This number identifies the Client "Gerardo Ruiz" within the MIS and is displayed twice in the example. It is shown in the URL address itself as illustrated by reference number 12, and also in a particular field or location in the content of the website, as illustrated by reference number 13. Different MISs can have the main keys in different locations within the website and/or address. That is why it is important that the user repeats the process of opening each Basic URL with three different Basic Units and identifying the location or locations of the primary key within it, in the initial configuration of the toolbox for that given MIS. This example includes the main key in the URL, as shown by reference number 12, which makes it necessary to load other Basic URLs and perform the process described above, to correctly identify the Basic URL. we could not use it as a classification element for the MIS. The Basic URL together with the Index of the operation/file/client, etc., constitutes a unique pair that will be used to associate the information from the tools to the corresponding Basic Unit of the corresponding MIS. The bubbles 15 with numbers are used in this example to visually display when there are notifications or "news" for the user regarding the respective tools for the active Basic Unit. The behavior of these notifications can be programmed as decides by design, but as an example of implementation they could work like this: The display of the "bubbles" will depend on the level where the user is. Taking into account that the user must first "log in" to the system for the tools to be activated, the alerts can follow the following protocol:

A) If the user is not in any MIS configured by/for him (the active URL is unknown to the system), the Toolbox will show the triggered alerts for all the configured MISs B) If the user is in a configured MIS (active URL is known), the Toolbox will show the alerts triggered for the Basic Units of that MIS, in addition to "hinting" the existence of other alerts triggered in other MISs.

Figure 2:
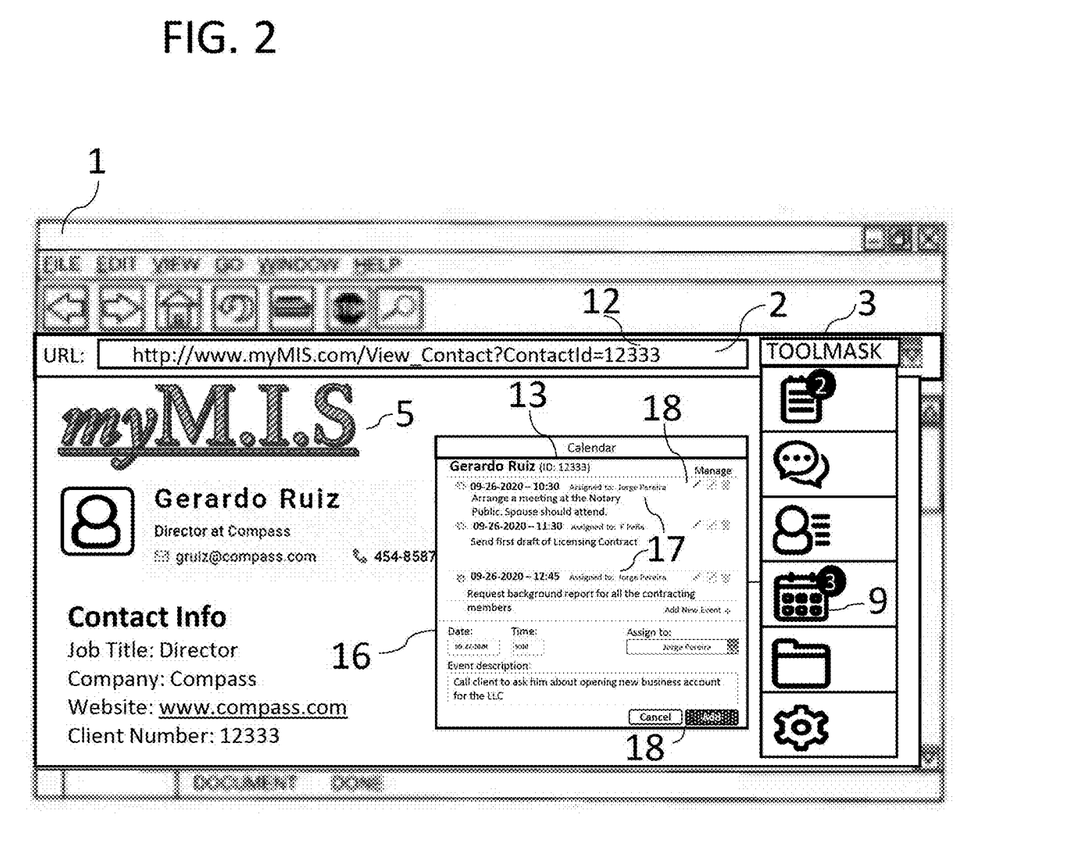
FIG. 2 is a representation of a computer screen showing an example of a Main information System open in a web browser, together with an embodiment of a Non-Invasively Integrated Main Information System Modernization Toolbox in accordance with the present invention, in which one of the tools (the calendar) is expanded to illustrate how the tool window works in context.

C) If the user is in a configured MIS and already within a specific Basic Unit, the Toolbox will show the alerts triggered for that Basic Unit, in addition to "hinting" the existence of other alerts triggered for other Basic Units of the same MIS FIG. 2 shows the same example of MIS, Basic Unit, and tools of FIG. 1, but, in it, the Tool Window 16 is open and showing the information related to the Calendar tool. This can be achieved by a user when clicking in the Calendar 9 icon. Arrows, crosses, or other elements of design can be used to open and close the Tool Window 16 when desired, and its size and location may vary as well as its contents and functionalities. In the example, The Client 1D, which acts as the main key, is displayed also within the window (reference 13). Information about events previously added in the calendar about that Basic Unit is displayed (reference 17) and different actions are presented to add, delete, or edit information about the Basic Unit (reference 18).

Figure 3:
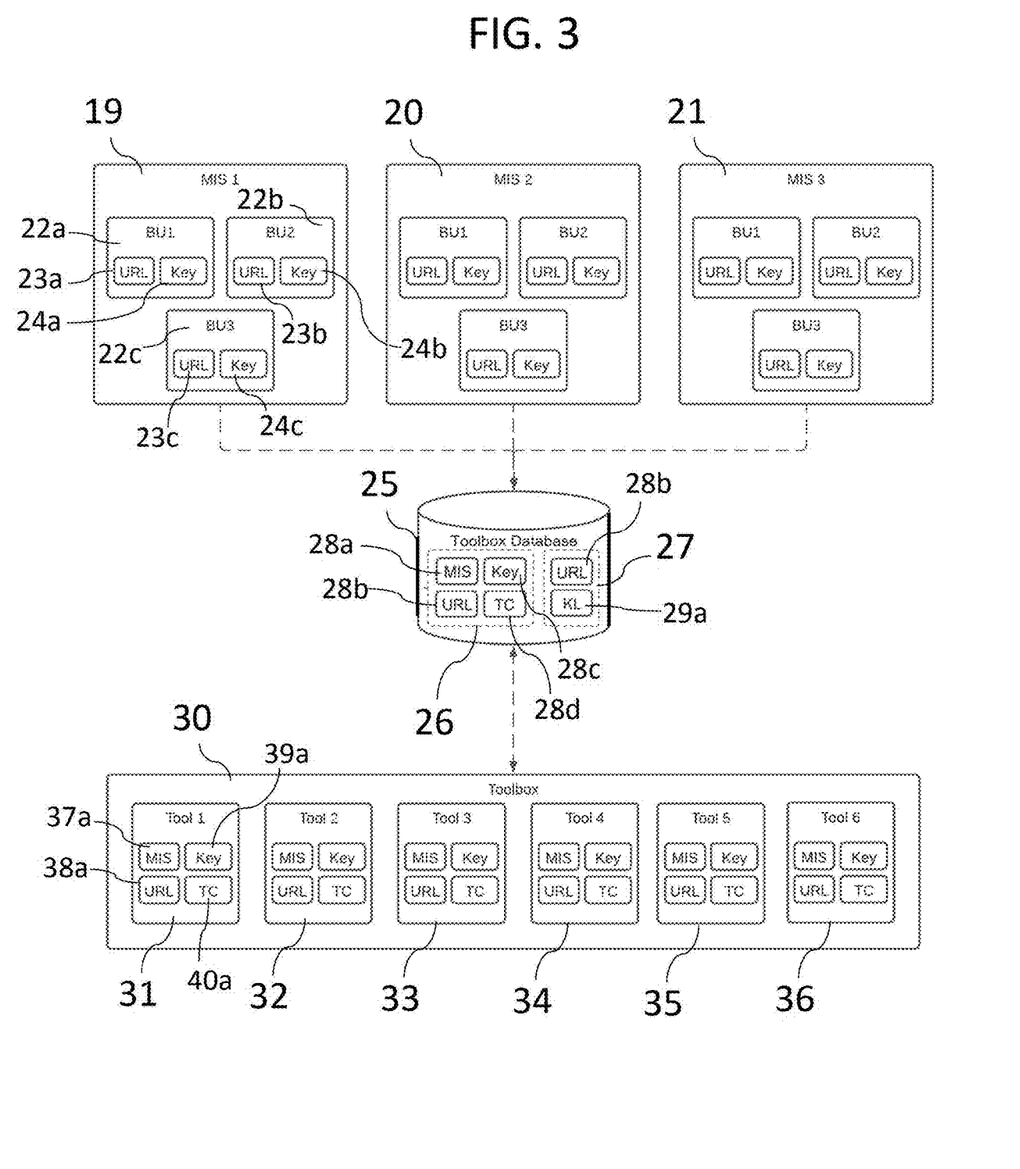
FIG. 3 is a diagram representing the flow of information between the different Basic Units of a MIS and the different Tools of a Toolbox in an embodiment of a Non-Invasively Integrated Main Information System Modernization Toolbox in accordance with the present invention.

FIG. 3 is a diagram representing the flow of information between the different Basic Units of a MIS and the different Tools of a Toolbox. In it, three different MISs are shown: "MIS 1" with reference 19, "MIS 2" with reference 20, and "MIS 3" with reference 21. Each of these MISs represent different existent Main Information Systems to which the toolbox could adapt so that the user can interact with the information extracted from them through the toolbox's different tools. However, a user may choose to utilize the toolbox with only one MIS, and a lot more that three MISs can be integrated to the toolbox (virtually, an unlimited number of them). The quantity of three MISs shown in this diagram, therefore, is only used for the sake of clarity. For each one of these MISs three Basic Units are shown, with reference numbers 22a, 22b, and 22c, respectively, for the "MIS 1" 19. Of course, a MIS would likely have a much greater number of Basic Units in it, and the number of three is here again chosen only for the convenience of representation. Each one of these Basic Units has a URL and a Main Key associated to it. For example, for the "MIS 1" 19. the "Basic Unit 1" 22a has a URL 23a and a Main Key 24a, the "Basic Unit 2" 22b has a URL 23b and a Main Key 24b, and the "Basic Unit 3" 22c has a URL 23c and a Main Key 24c. The same concept is repeated for all the Basic Units of all the MISs with which the Toolbox is desired to be configured to work. In sum, the information about the URL and the Main Key for every Basic Unit of every MIS is collected (scrapped from the web) and stored in the Toolbox Database 25. For this to be possible, the user must be logged into the respective MISs and have the necessary permissions to access the contents.

The Toolbox Database 25 includes a Main Table 26 and a Subtable 27. In other embodiments, the database configuration may vary as long as the functionality is maintained. In the illustrated embodiment, the Main table 26 includes four variables:

(a) The MIS 28a, which identifies to which MIS the information stored makes reference. In this case, whether it is the "MIS 1" 19, the "MIS 2" 20 or the "MIS 3" 21, but of course if there are more MISs, any code or identifier of which one of them the entry is associated would suffer.

(b) The URL 28b, which correlates with the URL information extracted before. For example, For the "Basic Unit 1" 22a, it would be the URL 23a.

(c) The Main Key 28c, which correlates with the Main Key information extracted before. For example, For the "Basic Unit I" 22a, it would be the Main Key 24a.

(d) The Tool Content, which is the content generated by the different tools of the toolbox with reference to the Basic Unit in question. This can actually include a plurality of variables that a Person of Ordinary Skill in the Art can easily derive from these teachings, depending on the specific tools to utilize. These variables have been integrated herein into a single concept "TC" (meaning "Tool Content") for the ease of representation. For example, if the tool is a Calendar as the one shown in FIG. 2, the information pertaining to this TC would include the identification that it is indeed, a calendar entry, the date and time of each event, the text of the events, to whom it is assigned, etc. A number of tables designed specifically to interact with each tool as desired should be created, always keeping reference to the Basic Unit these entries refer to, with reference to the variables from points (a), (b) and (c) above.

Additionally, the Subtable 27 is an auxiliary table that includes the relationship between the URLs 28b stored in the Main Table 26 and the Key location 29a for each of them. That is, the information about where on the web page the Main Key 28c can be located. Moreover, other auxiliary tables may include further information for improving the search speed, for example, information related to the Nodal URLs and the sitemap structure of each MIS.

The Toolbox 30 includes "Tools 1 to 6", represented by the reference numbers 31 to 36 respectively, and each referring to one of the tools of the toolbox. In the example of FIG. 1, they would be notes 6, associated to "Tool 1" 31, Messages 7, associated to "Tool 2" 32, Contacts 8. associated to "Tool 3" 33, calendar 9, associated to "Tool 4" 34, a shared folder 10, associated to "Tool 5" 35 and finally. Setup 11, associated to "Tool 6" 36. In other embodiments, other quantities and functionalities of tools are used. For each of these tools, at least four variables are stored in the Toolbox Database 25:

(a) The MIS 37a, which identifies to which MIS the information stored makes reference, in this case, whether it is the "MIS 1" 19, the "MIS 2" 20 or the "MIS 3" 21, but of course if there are more MISs, any code or identifier of which one the entry is associated to would suffy. This information corresponds with the MIS 28a information which is extracted by the tool from the Toolbox Database 25 when needed and used to identify the Tool Content generated by the tool in reference to the corresponding Basic Unit.

(b) The URL 38a, which correlates with the URL information extracted before. For example, For the "Basic Unit 1" 22a, it would be the URL 23a. This information corresponds with the URL 28b information which is extracted by the tool from the Toolbox Database 25 when needed and used to identify the Tool Content generated by the tool in reference to the corresponding Basic Unit.

(c) The Main Key 28c, which correlates with the Main Key information extracted before. For example, For the "Basic Unit 1" 22a, it would be the Main Key 24a. This information corresponds with the Main Key 28c information which is extracted by the tool from the Toolbox Database 25 when needed and used to identify the Tool Content generated by the tool in reference to the corresponding Basic Unit.

(d) The Tool Content, which is the content generated by the specific tools of the toolbox with reference to the Basic Unit in question. Each one of the tools 31 to 36, will have different information associated with it, which will be identified in the TC compound variable 284 of the Toolbox Database 25.

The information about the content on these variables flow from the MISs to the Toolbox Database 25 in a single direction, since the Toolbox in principle does not have access to writing in the MIS itself and flows from the Toolbox Database 25 to and from the tools 31 to 36 of the Toolbox 30 in both directions, always keeping the necessary information to identify the Basic Unit to which the Tool Content refers.

The description as set forth is not intended to be exhaustive or to limit the invention to the precise form disclosed. Many modifications and variations are possible in light of the teachings above without departing from the spirit and scope of the forthcoming claims.

What is claimed is:

1. A computing system for controlling and augmenting information associated with Basic Units of a browser-accessible Main Information System, said computing system comprising computerized mechanisms for:
    a) recognizing Basic Units of said Main Information System and associating said Basic Units with a Basic URL;
    b) identifying an active Basic Unit of said Main Information System when a user accesses an active URL through a web browser, wherein if said active URL is associated with a Basic Unit, it is considered a Basic URL associated with said Basic Unit;
    c) displaying a toolbox, which is shown in a content area of a screen, wherein said screen also displays, in another content area, an active Basic URL of said browser-accessible Main Information System, said toolbox comprising icons for allowing the user to select an active tool from a plurality of available tools, said tools allowing the user to add, delete, and edit information associated with the active Basic Unit;
    d) organizing, storing, and retrieving information extracted from said browser-accessible Main Information System and information generated by said tools in a database; and
    e) showing a tool window separate from said toolbox, which is shown in a content area of said screen which also displays said toolbox and said active basic URL, wherein said tool window allows the user to add, delete, and edit information associated with said active Basic Unit by using the selected tool;
wherein said computing system is embodied in a computer having a processor, a screen and browser access;
wherein when the user is browsing a Basic URL which is already stored into said database, and selects any of the Toolbar's tools, said computing system retrieves from said database all the information associated with said Basic Unit for the selected tool, and displays said information in said tool window;
wherein recognizing Basic Units of said Main Information System and assigning a Basic URL to each of them comprises a Unique Pair for identifying each Basic Unit, said Unique Pair consisting of a Main Key and a Basic URL, wherein said Basic URL and said Main Key are extracted from the active Basic URL of the browser-accessible Main Information System, from content areas identified by the user in an initial setup process;
and
wherein said tools are non-invasively integrated to said Main Information System, without modifying source code of said Main Information System which is only accessed by said computing system through a web browser.

2. The computing system of claim 1, wherein said Basic URLs and said Main Keys are extracted from a plurality of URLs of said browser-accessible Main Information System, with use of an Artificial Intelligence model.

3. The computing system of claim 1, wherein said initial setup process comprises a component that prompts the user to perform at least three cycles of Main Key identification, said cycles comprising:
    a) a first cycle, in which the user is prompted to browse to an active URL containing a first Basic Unit within said browser-accessible Main Information System, wherein said computing system captures a first Basic URL, prompts the user to identify the location of the Main Key in said Basic URL and stores said Basic URL associated with said Main Key in said database;
    b) a second cycle, in which the user is prompted to browse to a second active URL containing a second Basic Unit within said browser-accessible Main Information System, wherein said computing system captures a second Basic URL, compares the first basic URL to the second Basic URL to confirm if they are identical, and if not, to determine and isolate a component that remains identical in both, which is identified with an X variable being n characters long; and c) a third cycle, in which the user is prompted to browse to a third active URL containing a third Basic Unit within said browser-accessible Main Information System, wherein said computing system captures a third basic URL, isolates "n" characters of said third basic URL storing them in a Y variable, and compares said "n" characters to the X variable determined in the previous cycle;

wherein if the Y variable obtained in this cycle has an identical value to the X variable obtained in the previous cycle, said computing system confirms a successful configuration and stores each unique pair of Basic URL and location of the Main Key for said Basic URL; and wherein if the Y variable obtained in this cycle has a non-identical value to the X variable obtained in the previous cycle, the system repeats the step described in the third cycle, browsing to a new Basic Unit, and identifying a new value for the Y variable.

4. The computing system of claim 1, wherein said toolbox comprises at least one of the following tools:

a) a Notebook tool, allowing the user to leave a note associated with a Basic Unit;

b) a Tasks tool, allowing the user to add, complete, assign to himself or to another team member, modify or record levels of advancement of tasks associated with the Basic Unit;

c) a Calendar tool, associated with the Basic Unit, with scheduling alerts to remember commitments and associated events;

d) a Contact Book tool, a storing information about a list of contacts associated with the Basic Unit, said information comprising names, phone numbers, and email of the contacts;

e) a Digital Folder tool, which acts a repository of documents associated with the Basic Unit; and f) a Messaging System tool, comprising a direct and isolated communication channel for each Basic Unit.

5. The computing system of claim 1, further comprising a notification component wherein a bubble containing the number of notifications associated with each tool for the active URL is displayed for each icon of said toolbox, wherein:

a) If the active URL is not part of a browser-accessible Main Information System already stored into said database, the Toolbox shows alerts for all the configured browser-accessible Main Information Systems;

b) If the active URL is part of a browser-accessible Main Information System already stored into said database, but is not a Basic URL of said browser-accessible Main Information System, the Toolbox shows alerts associated to the active browser-accessible Main Information System; and c) If the active URL is a Basic URL of a browser-accessible Main Information System already stored into said database, the Toolbox shows alerts associated with the active Basic Unit.

6. The computing system of claim 1, wherein said database is stored in the cloud, in a reliable repository and available for all authorized users.

7. A computer-implemented method for controlling and augmenting information associated to Basic Units of a browser-accessible Main Information System, the method comprising:

a) having a user browse to a Basic URL of a browser-accessible Main Information System;

b) retrieving a Main Key from said Basic URL;

c) consulting a database in which said Main Key and said Basic URL are stored and associated with a Basic Unit, which is an active Basic Unit;

d) displaying a toolbox which is shown in a content area of a screen, wherein said screen also displays, in another content area, an active Basic URL of said browser-accessible Main Information System, said toolbox comprising icons for allowing a user to select an active tool from a plurality of available tools, said tools allowing the user to add, delete, and edit information associated with the active Basic Unit;

e) having the user select one of the tools of the toolbox;

f) displaying in a tool window which is shown in a content area of said screen which also displays said toolbox and said active Basic URL, information associated with said Basic Unit and said Tool in said database; and g) allowing the user to add, delete, and edit information about said active Basic Unit by using the selected tool in said tool window and storing said information as updated by the user in said database, associated with said Basic Unit of said browser-accessible Main Information System, in such a way that if the user visits the same Basic URL again, the information displayed in said tool window when said tool is selected, will be the information as updated by the user in this step;

wherein said database contains information about users and user groups with associated access rights, configured to allow two or more users within a user group to share information stored in said database, wherein said information is displayed in said tool window whenever a registered user browses to a Basic URL of said browser-accessible Main Information System.

8. A computer-implemented method for a user to set up a computing system for controlling and augmenting information associated to Basic Units of a browser-accessible Main Information System, the method comprising the steps of:

a) downloading a Browser Extension from Chrome Web Store or similar;

b) registering as a user;

c) configuring general parameters;

d) browsing to a browser-accessible Main Information System;

e) selecting management tools to make available for said browser-accessible Main Information System;

f) identifying a first Basic URL within said browser-accessible Main Information System that contains information about a Basic Unit;

g) selecting a field where a Primary Key is located in said first Basic URL;

h) browsing to a second Basic URL within said browser-accessible Main Information System, wherein said computing system compares the first basic URL to the second Basic URL to confirm if they are identical, and if not, to determine and isolate a component that remains identical in both, which is identified with an X variable being n characters long; and i) browsing to a third Basic URL within said browser-accessible Main Information System, wherein said computing system isolates "n" characters of said third basic URL storing them in a Y variable, and compares said "n" characters to the X variable determined in last X variable;

wherein if the Y variable obtained in this cycle has an identical value to the X variable, said computing system confirms a successful configuration and stores each unique pair of Basic URL and location of the Primary Key for said Basic URL; and wherein if the Y variable obtained in this cycle has a non-identical value to the X variable, the system repeats steps described previously, browsing to a new Basic Unit, and identifying a new value for the Y variable; and wherein said computing system is embodied in a computer having a processor, a screen and browser access.

* * * * *